April 13, 1954     W. E. BELCHER, JR     2,675,510
MEASURING APPARATUS

Filed Oct. 16, 1951     2 Sheets-Sheet 1

*INVENTOR.*
WALLACE E. BELCHER JR.
BY
ATTORNEY.

April 13, 1954  W. E. BELCHER, JR  2,675,510
MEASURING APPARATUS

Filed Oct. 16, 1951  2 Sheets-Sheet 2

INVENTOR.
WALLACE E. BELCHER JR.
BY Arthur H. Swanson
ATTORNEY.

Patented Apr. 13, 1954

2,675,510

UNITED STATES PATENT OFFICE 2,675,510

MEASURING APPARATUS

Wallace E. Belcher, Jr., Bala Cynwyd, Pa., assignor to Minneapolis-Honeywell Regulator Company, Minneapolis, Minn., a corporation of Delaware Application October 16, 1951, Serial No. 251,519

9 Claims. (Cl. 318—29)

The present invention relates to measuring apparatus providing a measure of the value of a quantity by measuring a force or condition or effect which varies in predetermined, but non-linear, accordance with the value of the quantity. For example, a measure of the rate of fluid flow through a conduit is commonly obtained by measuring the pressure drop in the fluid as it passes through a suitably restricted portion of the conduit, and a measure of the temperature to which a thermocouple has its hot junction exposed is commonly obtained by measuring the thermocouple voltage.

As is well known, the relation between the rate of flow of a fluid through a conduit and the resultant pressure drop of the fluid across a restricted portion of the conduit is commonly expressed by the equation:

$$V^2 = c(P_1 - P_2) \quad (1)$$

where V represents the velocity or rate of flow of the fluid through the conduit, $P_1$ and $P_2$ respectively represent the fluid pressure at up-stream and down-stream portions of the conduit, and $c$ represents a constant.

As is also well known, the relation between the voltage and temperature of a thermocouple is given by the equation:

$$EMF = at + bt^2 \quad (2)$$

where EMF represents the voltage generated by the thermocouple, $t$ is the temperature difference between the thermocouple hot and cold junctions, and $a$ and $b$ are constants.

The values of the constants $a$ and $b$ in Equation 2 above depend upon the character of the thermocouple and its operating temperature range. With the usual thermocouples, the constant $a$ is much larger than the constant $b$. For example, within the temperature range of 0° to 100° C., the approximate values of the constants $a$ and $b$ for a copper-constantan thermocouple are 0.038616 and 0.0000414, respectively; the approximate values of the constants $a$ and $b$ for an iron-constantan thermocouple are 0.05151 and 0.0000065, respectively; and the approximate values of the constants $a$ and $b$ for a Chromel-Alumel thermocouple are 0.03975 and 0.0000122, respectively.

The general object of the present invention is to provide novel compensating means of a simple and effective character for use in obtaining a linear measure of the value of a quantity which varies in non-linear accordance with a force, an effect, or a condition which is directly measured.

The provision in measuring apparatus of such compensating means facilitates the production of suitable scales and charts by or on which measurements are indicated or recorded. Also, in some cases it is practically essential that the measurements of a quantity should be linear to permit that quantity to be readily compared or related to a linear measurement of some other quantity. For example, as I have explained in my concurrently filed application, Serial No. 251,518, certain commercially available statistical instruments may be used to solve equations including values which are measures of various variables, when, and only when, those values vary in linear proportion to the values of the variables.

In preferred forms of the present invention, use is made of measuring apparatus of the well known and extensively used self-balancing potentiometric type which is disclosed and claimed in the Wills Patent 2,423,540, granted July 8, 1947. That apparatus comprises a potentiometric measuring circuit including a slide wire resistor and a reversible motor which is automatically actuated on and in accordance with the direction and magnitude of changes in the value of a quantity measured. In the ordinary use of such apparatus to measure the rate of fluid flow in a conduit or the temperature of a thermocouple, the measures directly obtained vary in non-linear accordance with the corresponding changes in the rate of flow or thermocouple temperature, respectively.

In accordance with the present invention, apparatus of said Wills patent type may be used in obtaining linear measures of the varying values of such quantities as fluid rates of flow or thermocouple temperatures when that apparatus is combined with suitable means for effecting compensating adjustments in a bridge circuit employed to transmit measurements from the measuring apparatus proper to related indicating, recording, controlling, or comparison apparatus, or, alternatively, is combined with means for effecting compensating adjustments of the potentiometric measuring circuit of the apparatus.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described preferred embodiments of the invention.

Figure 1:
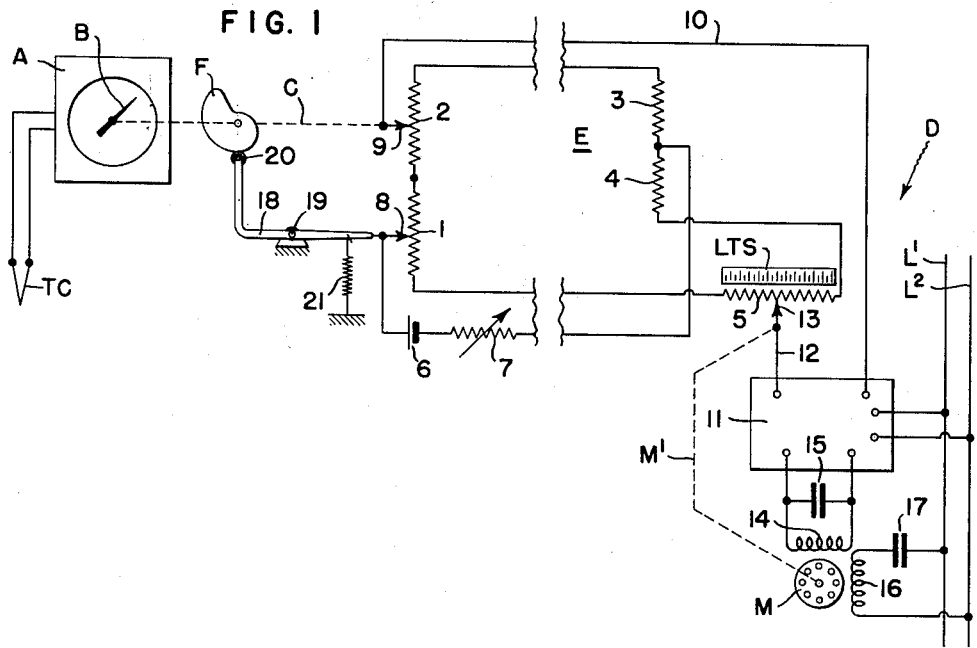
Fig. 1 is a diagrammatic representation of measuring, transmitting, and receiving apparatus including one embodiment of the present invention.

In the embodiment of the invention illustrated in Fig. 1, TC designates a thermocouple, and A designates a self-balancing measuring instrument of the type disclosed in the above mentioned Wills patent and including a rebalancing motor, not shown, the rotation of which positions a pointer B in linear accordance with changes in the thermocouple voltage. C represents a shaft which may be the shaft of the pointer B or the shaft of a gear element rotated in a predetermined manner with the pointer B.

In Fig. 1, the value of the quantity measured is transmitted to a receiver element D through a bridge circuit E. The circuit E, as shown, comprises slide wire resistors 1 and 2, fixed resistors 3 and 4, and a slide wire resistor 5, all connected in series in the order stated. The circuit E also comprises an energizing branch including a source of unidirectional current 6 and an adjustable resistor 7 connected in series between the connected ends of the resistors 3 and 4 and a slider contact 8 engaging and adjustable along the slide wire resistor 1. A slider contact 9, engaging the slide wire resistor 2, is adjusted along the latter by the shaft C in accordance with changes in the voltage of the thermocouple TC.

The contact 9 is connected by a conductor 10 to one input terminal of a device 11 which has its second input terminal connected through a conductor 12 to a slider contact 13 engaging and adjustable along the slide wire resistor 5. The latter is the receiver slide wire, i. e., the slide wire through which the circuit E impresses on the receiver D a corrected thermocouple signal. The scale LTS alongside of the resistor 5 is a linear temperature scale along which the contact 13 is positioned in linear proportion to the temperature of the thermocouple TC. The output terminals of the device 11 are connected to the control winding 14 of a reversible, two-phase motor M and to a condenser 15 which is connected in shunt to said winding. The motor M also has a power winding 16 arranged for connection in series wth a condenser 17 to alternating current supply conductors L′ and L². The latter may supply to the Fig. 1 apparatus alternating current of conventional frequency and voltage: for example, alternating current at 60 cycles per second and 115 volts.

The device 11 includes a converter portion which operates to convert unidirectional voltage signals which it receives from the circuit E into alternating current voltage signals which are better adapted for amplification in the amplifier which forms another portion of the device 11. The motor M and the device 11 of Fig. 1 may be identical with the rebalancing motor and asssociated converter and amplifier apparatus of said Wills patent. As shown, the motor M of Fig. 1 is operative to position the contact 13 along the resistor 5 through a mechanical link M′.

Insofar as it has been described, the apparatus shown in Fig. 1 would not produce or transmit a linear measure of the thermocouple temperature. Simple and effective compensation for the non-linear character of the temperature measurement provided by the circuit E may be obtained by effecting suitable adjustments of the slider contact 8 along the slide wire resistor 1. Those adjustments are effected automatically in the apparatus shown in Fig. 1 by means of a suitably shaped cam F which is secured to the shaft C and is rotated into different predetermined angular positions by given changes in the thermocouple voltage. As the cam F is rotated in the clockwise and counter-clockwise direction, it gives the contact 8 predetermined downward and upward movements, respectively, along the slide wire resistor 1 through a lever 18. The latter is mounted to turn about a pivoted support 19 and carries the contact 8 at one end. At its other end, the lever 18 supports a roller 20 which is in contact with the periphery of the cam F. As shown, a spring 21 acts on the lever 18 to hold the roller 20 against the periphery of the cam F at all times.

Upon an increase in the temperature of the thermocouple TC as measured by the instrument A, the operation of the apparatus is such that the contact 9 is moved upward along the slide wire resistor 2 by the shaft C for a distance dependent upon the magnitude of the temperature increase. Simultaneously, the cam F is rotated by the shaft C a corresponding amount in the counter-clockwise direction, whereby the contact 8 is moved upward along the slide wire resistor 1 for a corresponding distance. The resulting unbalance of the circuit E causes appropriate operation of the motor M and hence causes appropriate movement of the contact 13 to the right along the slide wire resistor 5 until the circuit E is once more in balance. As those skilled in the art will understand, accurate compensation for the non-linear relation between the voltage and temperature of the thermocouple, and accurate positioning of the contact 13 in linear accordance with the measured temperature, can be obtained with the apparatus shown in Fig. 1 when the periphery of the cam F is given the proper shape.

Figure 2:
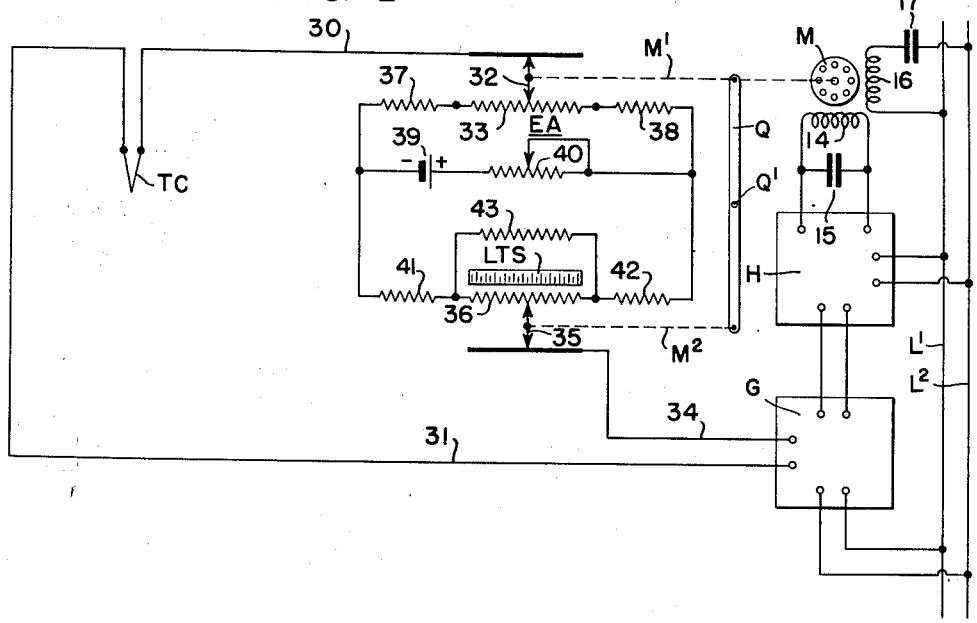
Fig. 2 is a diagrammatic view illustrating a second embodiment of the present invention.

Fig. 2 illustrates an embodiment of the invention in which automatic compensation for a non-linear measured effect of a variable such as a thermocouple temperature is effected in a self-balancing potentiometric bridge circuit AE which, except for its compensating provisions, may be like the potentiometric measuring circuit of the above mentioned Wills patent. In the embodiment shown by way of example in Fig. 2, the terminals of the thermocouple TC are connected to one another through the bridge circuit EA to a converter G. The converter G and an amplifier H control the rebalancing operations of a motor M in the same manner as the motor M of Fig. 1 is controlled by the device 11.

As shown, one conductor or terminal 30 of the thermocouple TC is connected through a slider contact 32 to a slide wire resistor 33 of the circuit EA. The other conductor or terminal 31 of the thermocouple TC is connected to one input terminal of the converter G, and the second input terminal of the converter G is connected to a conductor 34. The latter is connected through a slider contact 35 to a slide wire resistor 36 included in the circuit EA. Advantageously, and for a reason hereinafter explained, the resistance per unit of length of the resistor 36 progressively increases at a uniform rate from the right-hand end to the left-hand end of that resistor.

As shown, the first resistance branch of the circuit EA includes the main slide wire resistor 33 and also includes resistors 37 and 38 through which the ends of the resistor 33 are respectively connected to the negative and positive ends of an energizing branch of the circuit EA. The last mentioned circuit branch includes a source of unidirectional current, such as a battery 39, and an adjustable resistor 40. The second resistance branch of the circuit EA comprises resistors 41 and 42 through which the ends of the slide wire resistor 36 are respectively connected to the negative and positive ends of the energizing branch of the circuit EA. As shown, a resistor 43 is connected in shunt to the resistor 36. The slider contact 32 is adjusted along the slide wire resistor 33 by the motor M in a manner similar to that in which the motor M of Fig. 1 adjusts the slider contact 13 along the slide wire resistor 5.

As those skilled in the art will recognize, the apparatus shown in Fig. 2 does not differ structurally or in mode of operation from the measuring apparatus disclosed in said Wills patent, except in respect to the manner in which the second input terminal of the converter G is connected to the second resistance branch of the potentiometric bridge circuit EA. In the Wills patent, the converter input terminal corresponding to the conductor 34 of Fig. 2 is directly connected to the connected ends of resistors corresponding to the resistors 41 and 42 of Fig. 2. The apparatus disclosed in the Wills patent includes no elements corresponding to the slider contact 35, the slide wire resistor 36, or the shunt resistor 43 of Fig. 2.

The slider contact 35 of Fig. 2 is adjusted along the slide wire resistor 36 by the motor M in synchronism with the adjustments which the motor M gives to the slider contact 32. However, the direction of movement of the contact 35 is the reverse of the corresponding direction of movement given to the slider contact 32. As diagrammatically shown, the contact 35 is given its movements through a link $M^2$ which connects the contact 35 to the lower end of a lever Q having its upper end connected to the link M'. The latter connects the motor M to the lever Q and to the contact 32. The lever Q is mounted on a pivot Q' midway between its ends. The motor M may, if desired, actuate recording and controlling mechanism as does the rebalancing motor of the aforementioned Wills patent.

With the bridge circuit arrangement shown in Fig. 2, an increase or decrease in the voltage of the thermocouple TC unbalances the measuring circuit by respectively increasing or decreasing the potential difference between the conductors 30 and 31. With the indicated polarity of the battery 39 in the circuit EA, an increase or decrease in the thermocouple voltage will energize the motor M for operation in the direction to shift the main slider contact 32 along the slide wire 33 to the right or to the left, respectively, as seen in Fig. 2, as is conventional in the instrument art. The rebalancing operation effected by an increase or decrease in the potential difference between the conductors 30 and 31 will normally continue until the potential difference between the contacts 32 and 35 is made equal and opposite to the then existing voltage of the thermocouple TC.

In the rebalancing operation, the adjustment of the contact 35 reduces the magnitude of the adjustment of the contact 32 which would otherwise be required. Thus, for example, when the voltage of the thermocouple increases, the bridge circuit is unbalanced in consequence of the fact that the potential difference between the points of the bridge resistors 33 and 36 then respectively engaged by the contacts 32 and 35 is less than the voltage between the thermocouple terminals 30 and 31. The resultant adjustment of the contact 32 to the right increases the potential of the point of the resistor 33 engaged by the slider contact 32, and the simultaneous adjustment of the slider contact 35 to the left decreases the potential of the point of the resistor 36 engaged by the contact 35. Both the increase in the potential of the contact 32 and the decrease in the potential of the contact 35 contribute directly to the rebalancing of the measuring circuit.

The described adjustment of the slider contact 35 not only reduces the magnitude of the required rebalancing adjustment of the contact 32, but it also corrects for the non-linearity of the relation between the extent of adjustment of the contact 32 and the change in the thermocouple temperature resulting in that adjustment. If the resistance per unit length of the resistor 36 progressively increases at a uniform rate from its right-hand end to its left-hand end as previously mentioned, perfect compensation is obtainable for a thermocouple which generates an *emf* in accordance with Equation 2 above.

As is apparent from an inspection of Equation 2 above, the output *emf* of a thermocouple is related to the thermocouple temperature in accordance with a linear term ($at$) and a quadratic term ($bt^2$). In the circuit EA of Fig. 2, the linear portion of the thermocouple temperature-*emf* relationship is acted on by the slide wire resistor 33, while the quadratic portion of that relationship is acted on by the slide wire resistor 36. In other words, the rebalancing action performed by the adjustment of the contact 32 along the resistor 33 effectively balances out that portion of the total thermocouple *emf* which is represented by the linear term ($at$) of Equation 2, while the rebalancing action performed by the simultaneous and corresponding adjustment of the contact 35 along the resistor 36 effectively balances out that portion of the total thermocouple *emf* which is represented by the quadratic term ($bt^2$) of Equation 2.

For any conventional thermocouple, values for the resistances of the resistors 37, 38, 41, 42, and 43 of Fig. 2 can be selected as necessary to cause the apparatus to provide linear temperature indications over any desired range of temperatures. The resistor 43 determines by its resistance the effective resistance of the slide wire resistor 36, and hence provides a means for establishing the ratio of the effective resistances of the resistors 33 and 36. This in turn provides a means for establishing the correct relationship between the rebalancing actions for the linear and quadratic terms of Equation 2.

The relative effective resistances of the resistors 33 and 36 are determined by the previously stated Equation 2. Thus, for example, if the thermocouple TC is a copper-constantan thermocouple having the values for the constants $a$ and $b$ stated above, and if the thermocouple temperature range to be measured is from 0° to 100° C., substitution of the value 100 for $t$ and substitution of the above stated values for $a$ and $b$ into Equation 2 will give a value for the total generated thermocouple *emf* at full-scale of 3.8616 millivolts plus 0.414 millivolt. Therefore, the voltage drop across the slide wire resistor 33 in this case must be 3.8616 millivolts, which voltage drop can be obtained in practice by the proper selection of the magnitude of the resistance of the resistor 33 and of the magnitude of the current flowing through that resistor. Similarly, the voltage drop across the slide wire resistor 36 for the case being considered must be 0.414 millivolt, this voltage drop being obtainable by the proper selection of the magnitude of the effective resistance of the resistor 36 and of the magnitude of the current flowing through that resistor.

As will be apparent to those skilled in the art, the non-linear slide-wire resistor 36 would be of a relatively simple type, since its characteristic of a uniformly increasing resistance per unit length over its entire length can be obtained by winding the resistance wire of the resistor on a uniformly tapered card or form. Such progressive increase at a constant rate in the resistance per unit length of the resistor 36 means that the total resistance of any section of the resistor 36, extending away from the right-hand end of the latter, will be proportional to the square of the length of the section. The shunt resistor 43 does not prevent the voltage drop between the contact 35 and the right-hand end of the resistor 36 from varying in proportion to the square of the distance between the last mentioned contact and resistor end, since, when the circuit EA is balanced, no current flows through the conductor 34 and contact 35.

As those skilled in the art will readily recognize, the non-linear slide wire resistor 36 of Fig. 2 may, if desired, be replaced by a linear slide wire resistor, provided that the lever Q and/or the link M² is given the necessary form so as to cause the movement of the contact 35 along the resistor 36 to be effected in a suitable non-linear manner. A suitably shaped cam, such as the cam F of Fig. 1, can, for example, be added to the driving linkage for the contact 35 so as to impart the required non-linear motion to the latter.

Figure 3:
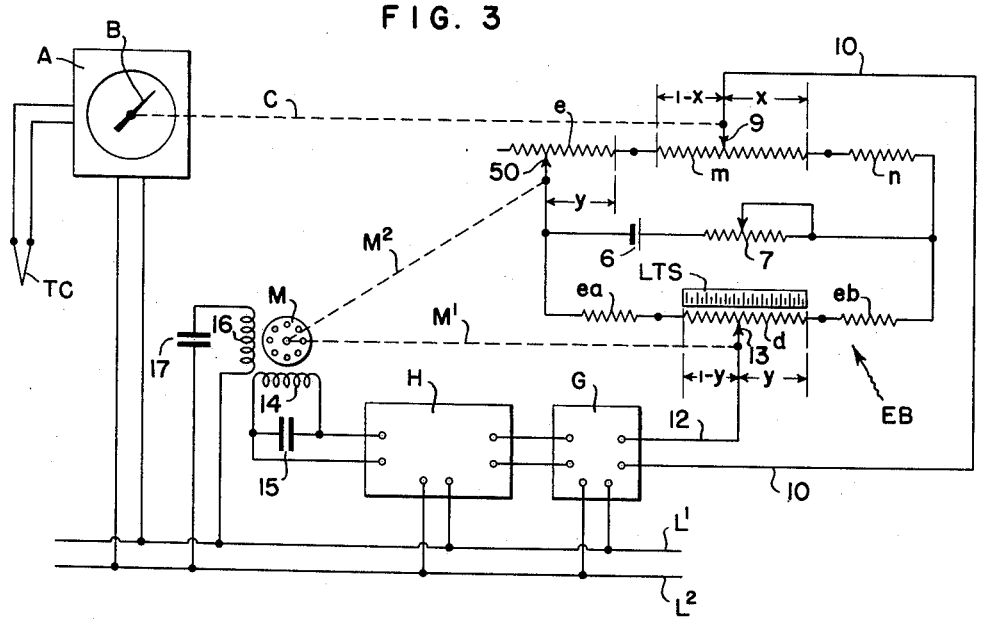
Fig. 3 is a diagram illustrating a third embodiment of the invention.

Fig. 3 illustrates a third form of the invention which comprises measuring apparatus substantially like that shown in Fig. 1, except that the circuit EB of Fig. 3 differs from the circuit E of Fig. 1 in form and in the character of its compensating provisions. However, the apparatus shown in Fig. 3 includes numerous elements which are shown in Fig. 1 and which are designated by the same reference numerals in Fig. 3 as in Fig. 1, and hence need not be further described herein.

The circuit EB of Fig. 3 comprises two resistance branches, one of which includes a resistor n, a variable portion of a resistor e, and a slide wire resistor m connected between and in series with the resistors n and e. The second resistance branch of the circuit EB comprises resistors ea and eb and a slide wire resistor d connected between and in series with the two resistors ea and eb. The terminals of the resistors n and eb remote from the resistors m and d, respectively, are directly connected together. The terminal of the resistor ea remote from slide wire resistor d is connected to a slider contact 50 which engages and is adjustable along the resistor e. The energizing branch of the circuit EB has one terminal connected to the connected terminals of the resistors n and eb, and has its second terminal connected to the terminal of the resistor ea which is connected to the slider contact 50. The energizing branch of Fig. 3 is like that of Fig. 1, in that it includes a source of unidirectional current 6 and an adjustable resistor 7.

In the circuit arrangement shown in Fig. 3, a slider contact 9 engages the slide wire resistor m and is adjusted therealong by the shaft C in linear accordance with variations in the voltage of the thermocouple TC. The circuit arrangement shown in Fig. 3 also includes a converter G, an amplifier H, and a motor M controlled through the amplifier H, all as in Fig. 2. The slider contact 9 is connected by the conductor 10 to one input terminal of the converter G, and the other converter input terminal is connected by the conductor 12 to the slider contact 13, all as in Fig. 1. In Fig. 3, the slider contact 13 engages and is adjustable along the slide wire resistor d. The motor M of Fig. 3 adjusts the slider contact 13 through an adjusting connection or link M' as in Fig. 1, and also adjusts the slider contact 50 through a link M². The resistors e, ea, and eb of Fig. 3 may have, and are herein assumed to have, equal resistance values. Such resistance equality is not essential, but serves to simplify the construction of the apparatus. Each of the resistors e, m, and d is of uniform resistance per unit length along its length.

In the contemplated operation of the apparatus shown in Fig. 3, an increase or a decrease in the voltage of the thermocouple TC energizes the motor of the apparatus A to effect rotation of the shaft C and movement of the slider contact 9 along the resistor m toward the left-hand or right-hand end thereof, respectively, for a distance varying in linear proportion to the variation in the voltage of the thermocouple TC, and in corresponding non-linear proportion to the variation in the thermocouple temperature. Such adjustment of the contact 9 unbalances the normally balanced circuit EB by making the potential of the contact 9 greater or less than the potential of the contact 13, and thereby creates a current flow in the detector circuit and energizes the motor M. The latter then operates to adjust each of the contacts 50 and 13 to the left or to the right, accordingly as the unbalancing adjustment of the contact 9 by the shaft C was to the left or to the right. The rebalancing action of the motor M continues until the potentials of the contacts 9 and 13 are again equalized.

Accordingly, a change in the thermocouple voltage which increases or decreases the potential of the contact 9 respectively increases or decreases the potential of the contact 13, and at the same time respectively increases or decreases the effective resistance of the resistor e.

In accordance with the present invention, the resistance values of the resistors d, e, ea, eb, m, and n are so related that the rebalancing operation of the motor M will adjust the contact 13 along the slide wire resistor d in linear proportion to the variations in the temperature of the thermocouple TC. That such a relationship and such a result are attainable in practice is best shown by comparing the characteristic thermocouple Equation 2 above with the equation for balance of the circuit EB of Fig. 3. Such a comparison will now be made as follows.

As given hereinbefore, the characteristic equation for a thermocouple is:

$$EMF = at + bt^2 \qquad (2)$$

This equation may be rewritten in the following form:

$$x = \frac{EMF}{EMF'} = A\left[\frac{t}{t'}\right] + B\left[\frac{t}{t'}\right]^2 \qquad (3)$$

wherein:

$x$ represents the position of the contact 9 on the resistor $m$,

EMF represents the thermocouple output corresponding to the position $x$,

EMF' represents the full-scale thermocouple output, $t$ represents the thermocouple temperature corresponding to the position $x$, $t'$ represents the full-scale thermocouple temperature, A represents a new constant replacing $a$, and B represents a new constant replacing $b$.

Equation 3 may be rewritten in the following form:

$$x = AT + BT^2 \quad (4)$$

wherein T represents the measured temperature as a fraction of the full-scale temperature.

At full-scale, with the contact 9 at the extreme left-hand end of the resistor $m$:

$$x = 1$$

and $$T = 1$$

Therefore, at full-scale, Equation 4 becomes:

$$1 = A + B$$

from which it can be seen that:

$$A = 1 - B \quad (5)$$

Substituting Equation 5 into Equation 4 gives:

$$x = (1-B)T + BT^2 \quad (6)$$

This Equation 6 will be compared below with the equation for balance for the circuit EB.

In order to evaluate the constants A and B and the term T for a particular case by way of example, let it be assumed that the temperature range to be measured by the apparatus is 0° to 100° C. With this assumption, Equation 2 for full-scale becomes:

$$EMF' = a(100) + b(100)^2 \quad (7)$$

Using Equation 2, Equation 3 can be rewritten:

$$x = \frac{EMF}{EMF'} = \frac{EMF}{a(100) + b(100)^2} \quad (8)$$

Dividing both sides of Equation 2 by the full-scale thermocouple output $a(100) + b(100)^2$ of Equation 7 gives:

$$\frac{EMF}{a(100) + b(100)^2} = \frac{at}{a(100) + b(100)^2} + \frac{bt^2}{a(100) + b(100)^2} \quad (9)$$

Substituting Equation 8 into Equation 9 and factoring gives:

$$x = \frac{a}{a + 100b}\left[\frac{t}{100}\right] + \frac{b}{\frac{a}{100} + b}\left[\frac{t}{100}\right]^2 \quad (10)$$

But Equation 4 states:

$$x = AT + BT^2 \quad (4)$$

Accordingly, by comparing Equations 10 and 4, it can be seen that, for the assumed range:

$$A = \frac{a}{a + 100b} \quad (11)$$

$$B = \frac{b}{\frac{a}{100} + b} \quad (12)$$

and $$T = \frac{t}{100} \quad (13)$$

Turning now to the circuit EB, the simplest equation for balance of this circuit is seen to be as follows:

$$\frac{yE + (1-x)M}{E + (1-y)D} = \frac{xM + N}{yD + E} \quad (14)$$

wherein:

$y$ represents the position of the contact 13 on the resistor $d$,

E represents the resistance of the resistors $e$, $ea$, and $eb$,

M represents the resistance of the resistor $m$,

N represents the resistance of the resistor $n$, and

D represents the resistance of the resistor $d$.

The apparatus of Fig. 3 is so constructed and arranged that the movement of the contact 9 from the zero or right-hand end of the resistor $m$ to the full-scale or left-hand end thereof causes corresponding movement of the contact 13 from the right-hand, zero end of the resistor $d$ to the left-hand, full-scale end thereof when the circuit EB is in balance. Accordingly, when $x=0$, $y=0$, and when $x=1$, $y=1$. Therefore, when $x=0$, $y=0$, and Equation 14 for this condition becomes:

$$\frac{M}{E+D} = \frac{N}{E}$$

or $$ME = N(D+E) \quad (15)$$

Also, when $x=1$, $y=1$, and Equation 14 for this condition becomes:

$$\frac{E}{E} = \frac{M+N}{D+E}$$

or $$M + N = D + E \quad (16)$$

By means of Equations 14, 15, and 16, solving for $x$ and rearranging gives:

$$x = \left[1 - \frac{DE}{M(D+2E)}\right]y + \left[\frac{DE}{M(D+2E)}\right]y^2$$

or $$x = (1-K)y + Ky^2 \quad (17)$$

wherein $$K = \frac{DE}{M(D+2E)} \quad (18)$$

Returning to the characteristic thermocouple Equation 6 and comparing this equation with Equation 17 for balance of the circuit EB gives:

$$x = (1-B)T + BT^2 \quad (6)$$

$$x = (1-K)y + Ky^2 \quad (17)$$

from which it can clearly be seen that these two equations are identical when:

$$K = B \quad (19)$$

and $$y = T$$

Since T is proportional to the thermocouple temperature $t$ as shown by Equation 13 above, it has now been clearly demonstrated that the circuit EB will cause the contact 13 to be positioned along the resistor $d$ in linear accordance with the thermocouple temperature $t$.

In order to determine or compute the resistance values for the resistors of the circuit EB corresponding to a particular chosen temperature range and type of thermocouple, it is only necessary to solve the three Equations 15, 16, and 18 simultaneously. These equations are collected below for convenience, the term K of Equation 18 being replaced by the term B in accordance with Equation 19:

$$ME = N(D+E) \quad (15)$$
$$M+N = D+E \quad (16)$$
$$B = \frac{DE}{M(D+2E)} \quad (20)$$

The simultaneous solution of the above three equations for the three values of M, N, and D can readily be performed by assigning a suitable value for E, and by computing the value of B, for the particular selected range and type of thermocouple, from Equation 12. It is obviously desirable in the selection of a value for E to avoid such a value as would require undesirably high or low values for the other circuit resistances.

By way of illustration and example, and not by way of limitation, a specific case will now be considered. Continuing the above-made selection of a temperature range of 0° to 100° C. and selecting a copper-constantan thermocouple, the solution of Equation 12 using the values for $a$ and $b$ hereinbefore stated gives:

$$B = \frac{b}{\frac{a}{100} + b} \quad (12)$$

$$= \frac{0.0000414}{0.00038616 + 0.0000414}$$

$$B = 0.09683$$

Next, the assignment of a convenient manufacturing value of 40 ohms for E in the above Equations 15, 16, and 20, and the use in these equations of the value of B just determined, give the following values for the resistances M, N, and D of the respective resistors $m$, $n$, and $d$:

$$M = 23.727 \text{ ohms}$$
$$N = 21.149 \text{ ohms}$$
$$D = 4.876 \text{ ohms}$$

While the forms of the invention shown in Figs. 1, 2, and 3 are specifically different, they have common characteristics. Thus, for example, the form of the invention shown in Fig. 3 comprises a circuit which includes a transmitting slide wire $m$ and a receiving slide wire $d$, corresponding generally to the transmitting slide wire 2 and receiving slide wire 5, respectively, of the circuit shown in Fig. 1. The forms of the invention shown in Figs. 2 and 3 are also similar to one another in that each includes electrical circuit means for reducing a quadratic equation so as to represent a variable in a linear fashion. It will be observed, also, that the three forms of the invention shown in Figs. 1, 2, and 3 are generally alike in that each discloses self-balancing measuring apparatus for obtaining a linear measure of the magnitude of a first condition, such as thermocouple temperature, which varies non-linearly with variations in a second condition, such as thermocouple emf. Each of the arrangements disclosed herein comprises a normally balanced circuit including first and second slide wire resistors which are located in different portions of the circuit and which are equipped with individual slider contacts. Each arrangement further includes mechanism which is connected to displaced points in its circuit and which is responsive to unbalance of the circuit to adjust at least one of the slider contacts in the direction to rebalance the circuit upon unbalance thereof. Also included in each of the disclosed arrangements are means to unbalance the associated circuit in accordance with changes in the magnitude of the second condition, and means operative to adjust the other of the aforementioned slider contacts upon changes in the magnitudes of the first and second conditions to change further the condition of balance of the circuit by an amount varying in non-linear accordance with respect to the magnitude of the second condition, thereby to effect the adjustment of the first mentioned one of the slider contacts in linear accordance with changes in the magnitude of the first condition.

While, in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent is as follows:

1. Self-balancing measuring apparatus for obtaining a linear measure of the magnitude of a first condition which varies non-linearly with variations in a second condition, comprising a normally balanced circuit including first and second slide wire resistors in different portions of said circuit, first and second slider contacts respectively engaging and adjustable along said first and second resistors, a first mechanism responsive to a change in the magnitude of said second condition corresponding non-linearly to a change in the magnitude of said first condition for adjusting said first contact along said first resistor in linear accordance with the first mentioned change and thereby unbalancing said circuit, a second mechanism responsive to the variation in the relative potentials of said first contact and a point in said circuit produced by the adjustment of said first contact for adjusting said second contact along said second resistor, and means actuated by one of said mechanisms for varying the relative resistances in different portions of said circuit in predetermined non-linear proportion to the adjustment of at least one of said contacts, and thereby for rebalancing said circuit and making the adjustment of said second contact linearly proportional to the change in the magnitude of said first condition.

2. Self-balancing measuring apparatus for obtaining a linear measure of the magnitude of a condition which gives rise to a non-linear effect, comprising a normally balanced circuit including first and second slide wire resistors in different portions of said circuit, first and second slider contacts respectively engaging and adjustable along said first and second resistors, a first mechanism responsive to a change in the magnitude of said effect corresponding non-linearly to a change in the magnitude of said condition for adjusting said first contact along said first resistor in linear accordance with the first mentioned change and thereby unbalancing said circuit, a second mechanism responsive to the variation in the relative potentials of said first contact and a point in said circuit produced by the adjustment of said first contact for adjusting said second contact along said second resistor, and means actuated by one of said mechanisms for varying the relative resistances in different portions of said circuit in predetermined non-linear proportion to the adjustment of at least one of said contacts, and thereby for rebalancing said circuit and making the adjustment of said second contact linearly proportional to the change in the magnitude of said condition.

3. Self-balancing measuring apparatus for obtaining a linear measure of the magnitude of a condition which gives rise to a predetermined non-linear effect, comprising a bridge circuit including first, second, and third slide wire resistors, first, second, and third slider contacts respectively engaging and adjustable along said first, second, and third resistors, means responsive to variations in the magnitude of said effect corresponding non-linearly to variations in the magnitude of said condition for adjusting said third contact along said third resistor in predetermined non-linear accordance with the first mentioned variations, means responsive to variations in the magnitude of said effect for adjusting said first contact along said first resistor in linear accordance with variations in the magnitude of said effect, and means responsive to the development of a potential difference between said first and second contacts for adjusting said second contact along said second resistor to eliminate said potential difference, and thereby for varying the position of said second contact along said second resistor in linear accordance with the variations in the magnitude of said condition.

4. Apparatus as specified in claim 3, in which the means for adjusting said first contact along said first resistor comprises a motor having a control winding responsive to variations in said effect, and in which the means for adjusting said third contact along said third resistor in predetermined non-linear accordance with the variations in the magnitude of said effect includes a cam actuated by said motor.

5. In self-balancing measuring apparatus for obtaining a linear measure of the magnitude of a condition which gives rise to a predetermined non-linear effect, the subcombination comprising a bridge circuit including two slide wire resistors, a separate slider contact engaging and adjustable along each of said resistors, a motor operating on and in accordance with a variation in the magnitude of said effect to adjust one of said contacts along the corresponding resistor in linear proportion to the change in the magnitude of said effect, and a cam through which said motor simultaneously adjusts the other of said contacts along the other of said resistors in predetermined non-linear accordance with the change in the magnitude of said effect.

6. In self-balancing apparatus for effecting linear measurements of the magnitude of a condition which gives rise to a voltage proportioned to the first and second powers of said magnitude, the combination of a split potentiometer bridge circuit comprising two resistance branches connected in parallel with one another and also comprising a bridge energizing means connected in series with each of said branches, a first slide wire resistor of uniform resistance per unit length from one end thereof to the other connected in one of said branches, a second slide wire resistor connected in the other of said branches and progressively increasing in resistance per unit length at a uniform rate from one end thereof to the other, first and second slider contacts respectively engaging and adjustable along said first and second resistors, a detector circuit, conductors adapted to connect a source of said voltage in series with said detector circuit between said contacts, and means controlled by said detector circuit and hence responsive to the difference in the potentials of said contacts and to said voltage for adjusting said contacts along their associated resistors in a direction to increase or decrease the potential of said first contact and to decrease or increase the potential of said second contact on an increase or decrease, respectively, in said voltage as necessary to reduce the resultant voltage across said detector circuit to zero, whereby the position of said second contact along said second resistor will vary in linear proportion to changes in the magnitude of said condition.

7. In self-balancing apparatus for effecting linear measurements of a thermocouple temperature, the combination of a split potentiometer bridge circuit comprising two resistance branches connected in parallel with one another and also comprising a bridge energizing means connected in series with each of said branches, a first slide wire resistor of uniform resistance per unit length from one end thereof to the other connected in one of said branches, a second slide wire resistor connected in the other of said branches and progressively increasing in resistance per unit length at a uniform rate from one end thereof to the other, first and second slider contacts respectively engaging and adjustable along said first and second resistors, a detector circuit, conductors adapted to connect a thermocouple in series with said detector circuit between said contacts, and means responsive to current flow through said detector circuit for proportionally adjusting said contacts along their associated resistors in a direction to increase or decrease the potential of said first contact and to decrease or increase the potential of said second contact on an increase or decrease, respectively, in the thermocouple voltage as necessary to eliminate said current flow, whereby the position of said second contact along said second resistor will vary in linear proportion to changes in the temperature of the thermocouple.

8. Self-balancing measuring apparatus for obtaining a linear measure of the magnitude of a first condition which varies non-linearly with variations in a second condition, comprising a potentiometric bridge circuit including a plurality of branches, conductors adapted to connect a source of energizing current to said circuit, one of said branches including first and third slide wire resistors and another of said branches including a second slide wire resistor, first, second, and third slider contacts respectively engaging and adjustable along said first, second, and third resistors, means for adjusting said first contact along said first resistor in linear accordance with variations in the magnitude of said second condition, and means responsive to the development of a potential difference between said first and second contacts for simultaneously and proportionally adjusting said second and third contacts along said second and third resistors, respectively, in the direction tending to reduce said potential difference, whereby said second and third contacts are positioned along their associated resistors in linear accordance with the magnitude of said first condition.

9. In self-balancing apparatus for effecting linear measurements of the magnitude of a condition which gives rise to an effect proportional to the first and second powers of said magnitude, the combination of a split potentiometer bridge circuit comprising two resistance branches connected in parallel with one another and also comprising bridge energizing means connected in series with each of said branches, a first slide wire resistor and an adjustable resistor connected in series in one of said branches, a second slide wire resistor connected in the other of said branches, first and second slider contacts respectively engaging and adjustable along said first and second slide wire resistors, a detector circuit, conductors operative to connect said detector circuit between said contacts, means responsive to variations in the magnitude of said effect and operative to position said first contact along said first resistor in linear accordance with variations in the last mentioned magnitude, and means operative under the control of said detector circuit and hence responsive to the potential difference between said contacts to adjust said second contact along said second resistor and simultaneously and proportionally to adjust said adjustable resistor as required to eliminate said potential difference, whereby said second contact is operatively positioned along said second resistor in linear accordance with the magnitude of said condition.

References Cited in the file of this patent

UNITED STATES PATENTS

| Number | Name | Date |
|---|---|---|
| 2,423,540 | Wills | July 8, 1947 |
| 2,574,656 | Peterson | Nov. 13, 1951 |